United States Patent [19]

Nakashio et al.

[11] 3,997,703

[45] Dec. 14, 1976

[54] MULTILAYERED MOLDED PLASTICS OF PULLULAN AND POLYMERS, PAPER OR ALUMINUM FOIL

[75] Inventors: Seizo Nakashio, Nishinomiya; Kozo Tsuji; Nobuhiro Toyota, both of Ibaragi; Fumio Fujita, Osaka; Takami Sato, Toyonaka, all of Japan

[73] Assignees: Sumitomo Chemical Company, Limited, Osaka; Hayashibara Biochemical Laboratories, Incorporated, both of Japan; part interest to each

[22] Filed: Feb. 27, 1975

[21] Appl. No.: 553,677

[30] Foreign Application Priority Data

Mar. 1, 1974  Japan .............................. 49-24388

[52] U.S. Cl. .............................. 428/457; 428/474; 428/480; 428/500; 428/532; 428/533; 156/328; 156/336; 264/186; 264/217; 264/DIG. 2; 264/241; 229/93; 426/106; 215/1 C

[51] Int. Cl.² ................... B32B 15/04; B32B 27/06
[58] Field of Search .......... 428/532, 533, 500, 480, 428/474, 457; 156/328, 336

[56] References Cited

UNITED STATES PATENTS

| 128,285 | 6/1872 | Chase ................................ 428/533 |
| 2,012,344 | 8/1935 | Levey ................................ 428/533 |
| 2,786,786 | 3/1957 | Novak et al. ...................... 428/533 |
| 3,424,648 | 1/1969 | Young .............................. 156/336 |

*Primary Examiner*—P. C. Ives
*Attorney, Agent, or Firm*—Stevens, Davis, Miller & Mosher

[57] ABSTRACT

A multilayered molded plastic having at least one layer comprising pullulan. The molded plastic is low in gas permeability, transparent, high in strength and nontoxic.

9 Claims, No Drawings

MULTILAYERED MOLDED PLASTICS OF PULLULAN AND POLYMERS, PAPER OR ALUMINUM FOIL

This invention relates to a multilayered molded plastic which is low in gas permeability, beautiful and tough and has an entirely novel structure. More particularly, the invention pertains to a multilayered molded plastic having at least one layer comprising pullulan.

Generally, films or sheets are frequently used as various packing materials. In recent years, packing materials have been required to have characteristic properties that cannot be attained by conventional materials. For example, there have been desired packing materials which can show such characteristic properties as low gas permeability, flavor-retaining property and oil resistance, without being deteriorated in transparency, surface gloss, beautiful appearance, heat resistance, etc.

Particularly for the packing of easily putrefactive foodstuffs such as, for example, fish, meat, dairy products, soy sauce, miso, mayonnaise and other various processed foods and frozen foods, there have been demanded packing materials which are transparent and are extremely low in gas permeability, particularly excellent in barriering property against oxygen, nitrogen, carbon dioxide and steam. When packed with materials having such properties as satisfying the above-mentioned conditions, foodstuffs can successfully be prevented from acidification and putrefaction. Further, the low permeability to organic vapors serves, for example, to retain the flavors of foodstuffs and prevents the packed foodstuffs from being contaminated by external odors.

Packing materials which are thus low in gas permeability can be used not only for the packing of foodstuffs but also for the packing, preservation or storage of various industrial materials such as metals, wood, and organic or inorganic industrial chemicals. For example, when products which are liable to undergo oxydative degradation are packed with packing materials low in oxygen permeability, the original states immediately after production of said products can be maintained over a long period of time, and thus the commodity values of the products can be enhanced.

On the other hand, packing materials are required to be excellent, according to their uses, in appearance, strength, softness, tenacity, heat-sealing property, water resistance, oil resistance, heat resistance, non-toxicity, printability and, in recent years, non-pollution-causing property, in addition to such characteristic properties as mentioned above. However, it is difficult to prepare such multi-purpose packing materials from a single material. Accordingly, packing materials that meet the demand of the market have hitherto been developed by the lamination of a plurality of materials. The technique of preparing materials having excellent properties of plastics by laminating a plurality of plastics has heretofore been utilized not only in the fields of films and sheets, but also in many other fields concerning tubes, pipes, bottles, containers, etc.

Heretofore, various materials have been developed by combining some of high molecular weight compounds relatively low in gas permeability such as polyamides, polyesters, polyvinyl chlorides, polyvinylidene chlorides, polyvinyl alcohols, ethylene-vinyl acetate copolymers, cellophane, acrylonitirle copolymers and amylose, sometimes, including aluminum foils, or by compounding some of the said high molecular weight compounds with polyolefins or polyvinyl compounds. However, some of the said materials have caused problems such as being expensive, difficulty subjected to lamination molding, or give molded articles extremely high in cost.

With an aim to solve the above-mentioned problems, the present inventors conducted extensive studies to find that when at least one layer comprising pullulan is used as a layer of multilayered molded plastic, not only can the molded article be greatly lowered in gas permeability with reduced expense, but also the molding operation for lamination can be facilitated.

An object of the present invention is to provide a novel multilayered molded plastic low in gas permeability.

Another object of the invention is to provide a multilayered molded plastic having at least one layer comprising pullulan.

Other objects and advantages of the invention will become apparent from the following description.

The pullulan used in the present invention is a high molecular weight linear polymer wherein units of maltotriose, which is a trimer of glucose, have been repeatedly bonded through $\alpha$-1,6 linkages which are different from those of said trimer, and has the molecular structure represented by the formula

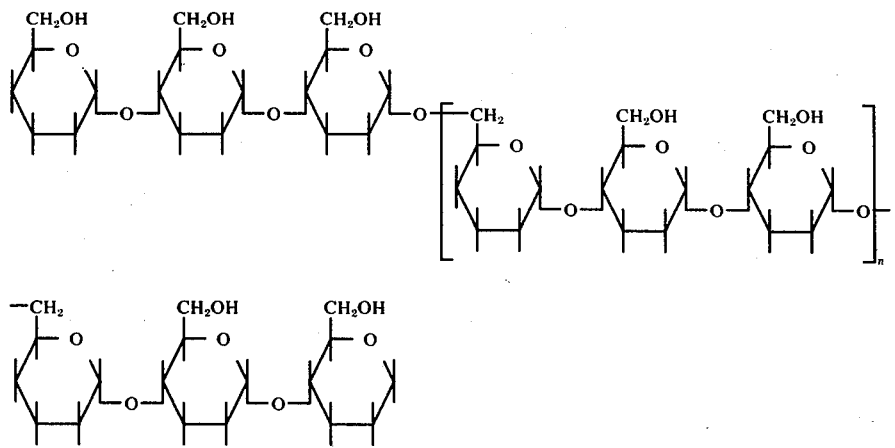

wherein $n$ is an integer of 20 to 10,000 which shows the polymerization degree.

The pullulan has merely been known until recently as a water-soluble tacky substance, and hence is a novel substance unknown in the field of multilayered molded plastics.

While the pullulan used in the present invention contains glucose units in its molecule, it is entirely different in molecular structure from starch, cellulose, amylose, carboxymethyl cellulose, alkyl cellulose and the like polysaccharides and derivatives thereof which have heretofore been used as films and which also are glucose derivatives composed mainly of glucose units, as in the case of pullulan. This fact is connected to the excellent properties of pullulan. Pullulan is markedly excellent in film-forming ability, and a film formed therefrom is excellent in such properties as strength, elasticity, hardness and gloss. In this respect, pullulan is entirely different from the above-mentioned polysaccharides or derivatives thereof which have no functionally excellent film-forming ability, and which, like amylose, can form films only by complex procedures. Further, a film formed from pullulan is extremely high in transparency, favorable in adhesiveness, heat resistance and weather resistance and low in gas permeability, and thus has properties equal to or more excellent than cellophane, which has ordinarily been said to be low in gas permeability. Moreover, pullulan is superior in properties to nylons or polyvinylidene chlorides.

Accordingly, a molded plastic having a layer comprising pullulan is more excellent than a conventional molded plastic in the following points:

1. Pullulan is low in gas permeability, and hence can form a layer which is sufficiently low in gas permeability even when the layer is thin in thickness.

2. Pullulan can form a layer high in transparency.

3. Pullulan is high in strength, and hence can give a tough molded plastic.

4. Pullulan is non-toxic, and hence can be handled with ease.

The pullulan used in the present invention is water-soluble by itself, but can be crosslinked and insolubilized by means of any of general crosslinking agents for active hydrogen-containing polymers which include aldehydes such as formaldehyde, acetaldehyde, butyl-aldehyde and glyoxal, various epoxy resins, diisocyanate and methylol-containing compounds such as dimethylolurea and dimethylol ethyleneurea. Alternatively, the pullulan can be crosslinked by application of light after addition of a bichromate. Further, the pullulan can be insolubilized by mixing an aqueous solution thereof with both a monofunctional monomer such as acrylamide, acrylic acid, methacrylic acid, 2-hydroxyethyl methacrylate or N-vinyl pyrrolidone, and a polyfunctional monomer such as ethylene glycol dimethacrylate, a polyethylene glycol dimethacrylate such as diethylene glycol dimethacrylate, triethylene glycol dimethacrylate or nonaethylene glycol dimethacrylate, or methylenebis acrylamide, and reacting the resulting mixture by application of heat or light in the presence of an initiator.

Further, in order to improve its physical properties, if necessary, the pullulan used in the present invention may be modified by esterification, alkyl etherification, or hydroxyalkyl etherification, may be blended with a water-soluble polymer such as polyvinyl alcohol, polyethyleneimine, polyacrylamide, polyacrylic acid, polyvinyl pyrrolidone, polyethylene oxide, sodium polyacrylate, sodium alginate, carboxymethyl cellulose or hydroxyethyl cellulose, or may be incorporated with, as a plasticizer, polyhydric alcohol such as glycerin, ethylene glycol, polyethylene glycol, sorbitol, propylene glycol or polypropylene glycol, dimethyl sulfoxide, water or amylose.

In the molded plastic of the present invention, compounds constituting the layers other than the pullulan layer are homopolymers or copolymers of olefins such as ethylene and propylene and/or vinyl compounds such as styrene, acylonitrile, vinyl acetate, vinyl chloride, vinylidene chloride, vinyl tetrafluoride, vinylidene fluoride, acrylic acid and methacrylic acid, or their salts or esters, which include concretely polyethylene, polypropylene, ethylene-vinyl acetate copolymer, polyvinyl acetate, polyvinyl chloride, polyvinylidene chloride, polyethylene tetrafluoride, polyvinylidene fluoride, polystyrene, polyacrylonitrile, polyacrylic acid, polymethacrylic acid, polymethyl methacrylate, ethylene-propylene copolymer, ethylene-acrylic acid copolymer, ethylene-methyl acrylate copolymer, ionomer, propylene-vinyl chloride copolymer and ethylene-vinyl alcohol copolymer; polyester such as polyethylene terephthalate, polybutylene terephthalate and polycarbonate; polyamide such as nylon; celluloses, i.e. regenerated celluloses such as ordinary and moistureproof cellophanes, mono-, di- and tri-acetates of cellulose, cellulose derivatives such as carboxymethyl cellulose and alkyl celluloses; polyvinyl alcohols, polyvinyl alcohol derivatives and rubber hydrochloride. Further, paper or aluminum foils may be used instead of plastic layers mentioned above. These plastic layers may contain such additives as antistatic agents, lubricants, plasticizers, antioxidants, stabilizers, antiblocking agents, pigments and dyes, and may, if necessary, be subjected to surface activation treatment by such physical or chemical procedure as flame treatment, corona discharge treatment, or acid or alkali treatment. Further, the same plastic layers may, if necessary, be subjected to such modification treatment as foaming or stretching.

The multilayered molded plastic referred to in the present invention includes films, sheets, tubes, pipes, bottles and containers consisting of two or more layers. From the technical standpoint, however, molded plastics consisting of 5 or less layers can be produced with ease. The combination of materials to be used is desirably decided according to the uses of the resulting molded plastic, and is not particularly limited, and at least one of the aforesaid materials may optionally be combined with pullulan according to the application purpose of the molded plastic. For example, in the case of a compounded film high in heat-sealing property and low in gas permeability, there may be conclined a procedure wherein nylon, polyester or oriented polypropylene is laminated to the combination of polyethylene with pullulan. In the case where heat resistance is required, nylon or polyester may be laminated to pullulan. In the case where pullulan is subjected to water-insolubilization with chemical treatment in advance, a two-layered molded plastic consisting of said pullulan and another one is satisfactory, but in the case where no such treatment as above is applied to the pullulan, it is desirable to combine a further layer which is water-resistant with the two-layered molded plastic.

For the production of multilayered molded plastics according to the present invention, any conventional process may properly employed without limitation.

Examples of such processes include multilayer extrusion, multilayer injection molding, multilayer extrusion blow molding, multilayer injection blow molding, extrusion lamination, dry lamination, wet lamination and co-extrusion lamination processes. These processes may properly be adopted according to the desired combination of materials. In the case of the extrusion lamination process, it is preferable that the base polymer is subjected, if necessary, to physical or chemical treatment in order to improve the polymer in adhesiveness. The said treatment is carried out in, for example, such a manner that the base polymer layer is coated with an anchor coating agent, is subjected to corona discharged treatment, is mixed and reacted with a compound having functional groups, or is subjected to chemical oxidation or reduction. As the anchor coating agent, there may be used any of organotitinate compounds, organoaluminum compounds, polyalkyleneimines such as polyethyleneimine, aldehyde resins such as urea-aldehyde and melamine-aldehyde and polyisocyanate resin. On the other hand, pullulan, which is of course usable in the form of film or sheet, can also be molded with ease when heated after incorporation of a plasticizer such as, for example, water, glycerin, dimethyl sulfoxide, dimethyl formamide, ethylene glycol or propylene glycol, and hence can be used also as an extrusion material. In this case, water is the most excellent plasticizer. Further, most of modified pullulans can be molded without incorporation of plasticizers. Accordingly, it is also possible to carry out the so-called co-extrusion lamination, in which a laminated film is produced through one die by extruding the individual polymers from separate extruders, or to effect the dry or wet lamination, in which films are bonded by use of an adhesive. Since pullulan is excellent in film-forming ability, it is also possible to produce with ease a multilayered molded plastic by coating a pullulan solution on the surface of a molded plastic, and then removing the solvent by drying to form a pullulan layer on the surface of the molded plastic. It is one of the greatest characteristics of the present invention that the abovementioned process can easily be applied to pullulan. That is, pullulan has such characteristic that it is easily water-soluble, and its aqueous solution is stable and give a transparent and tough film. In this case also, it is preferable, for the enhancement in wettability and adhesion to the base polymer, that the base polymer is properly subjected to physical or chemical treatment such as corona discharge treatment or application of an anchor coating agent or an adhesive. Conversely, it is also possible to form a plastic film on the surface of a molded pullulan by coating a plastic solution or emulsion on the surface of the molded pullulan, and then removing the solvent by drying.

In the multilayered molded plastic of the present invention, the layer comprising pullulan can effectively display low gas permeability, regardless of whether the said layer is an internal, outside or inside layer of the molded plastic. In case a layer comprising pullulan is used as the inside layer of such molded plstic as a bottle or a container, not only the low gas permeability of pullulan can be enhanced, but also the bottle or container can be enhanced in accommodation for mineral oils such as spindle oil and motor oil, vegetable oils such as soybean oil and rape-seed oil, animal oils such as sardine oil and whale oil, and organic solvents such as benzene and toluene, and can be markedly increased in resistance to stress cracking. Further, in case a layer comprising pullulan is used as the internal layer, pullulan can be improved in water resistance and moisture resistance, while retaining its low gas permeability. In case a layer comprising pullulan is the outside layer of the molded plastic and thus the water resistance and the moisture resistance of the molded plastic become a problem, the surface of the molded plastic may be subjected to modification treatment or to water resistant treatment by coating the surface with a plastic. Even in this case, the low gas permeability is not lost.

The pullulan used in the present invention may be incorporated with proper amounts of such additives as antioxidants, ultraviolet absorbers, dyes, pigments, fillers, etc. The molecular weight of pullulan is not particularly limited, but is ordinarily 10,000 to 5,000,000, and preferably 50,000 to 1,000,000.

The pullulan used in the present invention is not particularly restricted in procedure for the preparation thereof. At present, it can be isolated and recovered as a tacky substance secreted in a culture liquor formed by culturing a strain of the genus Pullularia which is an incomplete microorganism. That is, a strain of the species *Pullularia pullulans* is subjected to shaking culture at 24° C. for 5 days in a medium containing 10% of partially hydrolyzed starch, 0.5% of $K_2HPO_4$, 0.1% of NaCl, 0.02% of $MgSO_4 \cdot 7H_2O$, 0.06% of $(NH_4)_2SO_4$ and 0.04% of yeast extract, whereby pullulan can be obtained as a tacky substance secreted from the cells into the culture liquor. If necessary, the cells are removed from the culture liquor by centrifugation, and the tacky substance is precipitated and separated by use of methanol, whereby purified pullulan is obtained. Pullulan varies more or less in physical properties depending on the kind of the strain used. This, however, is not particularly connected to the properties of pullulan as a molded article.

The present invention is illustrated in more detail below with reference to examples, but the invention is not limited to the examples.

EXAMPLE 1

A commercially available streched polypropylene film (thickness 25 $\mu$, density 0.908, produced by Toyobo Co., Ltd.) was subjected to corona discharge treatment for 30 seconds, using an electric power of 1 kw. As the result, the surface tension of the polypropylene film became 42 dyne/cm. On this film a 20% aqueous solution of pullulan (molecular weight 150,000) was coated to the form of film by use of an applicator. Subsequently, the pullulan solution was air-dried to obtain a transparent laminate film having a pullulan film of about 10 $\mu$ in thickness. The bonding strength between the two films was 500 g/25 mm. when peeled to an angle of 180°. Further, the amount of oxygen permeated through said laminate film was about 10 cc/m².day.atm.

EXAMPLE 2

Example 1 was repeated, except that the aqueous pullulan solution was replaced by a 15% aqueous solution of a 71 : 29 (wt) mixture of pullulan (molecular weight 150,000) and Poval 205 (polyvinyl alcohol, degree of polymerization 300 – 700, degree of saponification 87 – 89%, produced by Kurare Co., Ltd.), to prepare a laminate film. The bonding strength in this case increased to 750 g/25 mm. Further, the amount of oxygen permeated through the laminate film was about 20 cc/m².day.atm.

EXAMPLE 3

A 20% aqueous solution of pullulan (molecular weight 150,000) was cast on a glass plate, made uniform in thickness by use of an applicator and then air-dried to obtain a pullulan film having a thickness of 50 $\mu$. On the other hand, a polyethylene film Sumikathene L-705 (melt index 7; density, 0.919, produced by Sumitomo Chemical Co., Ltd.) was subjected to corona discharge treatment for 5 seconds, using an electric power of 1 kw, to make the surface tension thereof 40 dyne/cm. These two films were bonded at 150° C. for 1 minutes under a pressure of 10 kg/cm$^2$, moistened at a relative humidity of 80% for 17 hours, and then measured in bonding strength by peeling to an angle of 180° to obtain a value of 1.4kg/25 mm. The amount of oxygen permeated through this laminate film was about 2 cc/m$^2$.day.atm.

EXAMPLE 4

According to multilayer blow molding, there was prepared a bottle of 300 cc. in inner volume having a three-layered sandwich construction, in which the internal layer was composed of pullulan (molecular weight 150,000) containing 10 weight % of water, and the outside and inside layers were individually composed of a low density polyethylene (melt index, 7; density, 0.922). The thickness of the inside layer, the internal layer and the outside layer were 100 $\mu$, 20 $\mu$ and 100 $\mu$, respectively. This bottle was much lower in gas permeability than a blow-molded bottle of the same thickness and shape as above which was composed of a single layer of the low density polyethylene. Further, the strength of the three-layered bottle was equal to or greater than that of the single-layered bottle. The amount of oxygen permeated through said bottles were as shown in Table 1.

Table 1

| | Amount of permeated oxygen (cc/m$^2$ · day · atm ·) |
|---|---|
| Single-layered blow-molded bottle | 110 |
| Three-layered blow-molded bottle having pullulan layer | 5 |

EXAMPLE 5

Using a two-layer inflation film molding apparatus, there was produced a two-layered film of 100 $\mu$ in thickness which consisted of 50 $\mu$-thick layer composed of acetylated pullulan (molecular weight 150,000) having a substitution degree of 0.5, and a 50 $\mu$-thick layer composed of an ethylene-vinyl acetate copolymer (vinyl acetate content 15 weight %). This film was lower in gas permeability than an ethylenevinyl acetate copolymer film of the same thickness as above, and had sufficient softness. The amounts of oxygen permeated through said films were as shown in Table 2.

Table 2

| | Amount of permeated oxygen (cc/m$^2$ · day · atm ·) |
|---|---|
| Ethylene-vinyl acetate copolymer film | 420 |
| Two-layered film having acetylated pullulan layer | 10 |

What is claimed is:

1. A multilayered molded plastic which comprises at least one layer comprising pullulan and at least one layer selected from the group consisting of layers composed of homopolymers and copolymers of olefins and/or vinyl compounds, polyesters, polyamides, celluloses, polyvinyl alcohols, rubber hydrochlorides, paper and aluminum foil.

2. A multilayered molded plastic according to claim 1, wherein the homopolymers or copolymers of olefins and/or vinyl compounds are polyethylene, polypropylene, ethylene-vinylacetate copolymer, polyvinylacetate, polyvinylchloride, polyvinylidenechloride, polyethylene tetrafluoride, polyvinylidene fluoride, polystyrene, polyacrylonitrile, polyacrylic acid, polymethacrylic acid, polymethylmethacrylate, ethylene-propylene copolymer, ethylene-acrylic acid copolymer, ethylenemethylacrylate copolymer, ionomer, propylene-vinylchloride copolymer and ethylene-vinylalcohol copolymer.

3. A multilayered molded plastic according to claim 1, wherein the polyester is polyethylene terephthalate, polybutylene terephthalate or polycarbonate.

4. A multilayered molded plastic according to claim 1, wherein the polyamide is nylon.

5. A multilayered molded plastic according to claim 1, wherein the celluloses are ordinary and moisture-proof cellophans, mono-, di- and tri-acetate of cellulose, carboxymethyl cellulose and alkylcelluloses.

6. A multilayered molded plastic according to claim 1 which is in the form of films, sheets, tubes, pipes, bottles or containers.

7. A multilayered molded plastic according to claim 1, wherein the pullulan is blended with watersoluble polymers.

8. A multilayered molded plastic according to claim 7, wherein the water-soluble polymer is polyvinyl alcohol, polyethyleneimine, polyacrylamide, polyacrylic acid, polyvinylpyrrolidone, polyethylene oxide, sodium polyacrylate, sodium alginate, carboxymethyl cellulose or hydroxyethyl cellulose.

9. A multilayered molded plastic according to claim 1, wherein pullulan is modified by esterification, alkyl etherification or hydroxyalkyl etherification.

* * * * *